United States Patent [19]

Hochstrasser

[11] Patent Number: 5,043,592
[45] Date of Patent: Aug. 27, 1991

[54] WATER FITTING FOR SANITARY INSTALLATIONS

[75] Inventor: Ferdinand Hochstrasser, Auenstein, Switzerland

[73] Assignee: KWC AG, Unterkulm, Switzerland

[21] Appl. No.: 412,099

[22] Filed: Sep. 25, 1989

[30] Foreign Application Priority Data

Sep. 27, 1988 [CH] Switzerland .................... 03581/88

[51] Int. Cl.⁵ ............................................. F03B 13/10
[52] U.S. Cl. .......................................... 290/52; 290/54
[58] Field of Search ............... 290/52, 43, 54; 310/92, 310/103, 104; 4/623

[56] References Cited

U.S. PATENT DOCUMENTS

| | | | |
|---|---|---|---|
| 4,134,024 | 1/1979 | Wiseman | 290/52 |
| 4,207,485 | 6/1980 | Silver | 310/104 |
| 4,304,532 | 12/1981 | McCoy | 310/104 X |
| 4,352,025 | 9/1982 | Troyen | 290/54 |
| 4,487,557 | 12/1984 | Ruyak et al. | 310/104 X |
| 4,520,516 | 6/1985 | Parsons | 4/623 |
| 4,653,519 | 3/1987 | Kanner | 310/104 X |
| 4,927,337 | 5/1990 | Lustwerk | 310/104 X |

FOREIGN PATENT DOCUMENTS 1345411 5/1974 United Kingdom .

PCT/US84/-
01481 9/1984 World Int. Prop. O. .

Primary Examiner—A. D. Pellinen
Assistant Examiner—W. E. Duncanson, Jr.
Attorney, Agent, or Firm—Barnes & Thornburg

[57] ABSTRACT

The water fitting (10) has a substantially tubular casing (12) which is closed at one end by the partition element (16). The turbine wheel (24) which is acted upon in the axial direction by the water supplied through the inlet connection (14), is rotatably supported within the casing (12). The first coupling part (28), which has an annular permanent magnet (62), is rotationally solidly connected to the turbine wheel (24). The second coupling part (30), which is seated on the rotor shaft (70) of the direct current generator (20), is provided on the other side of the partition element (16). The second coupling part (30) also has an annular permanent magnet (62). The rotational motion of the turbine wheel (24) is transmitted magnetically to the rotor (74) of the direct current generator (20) by means of the two coupling parts (28, 30), this direct current generator supplying the electricity for charging the storage element (32) of the electrical control arrangement (36). The valve (38) is opened and closed by means of the control arrangement (36).

15 Claims, 1 Drawing Sheet

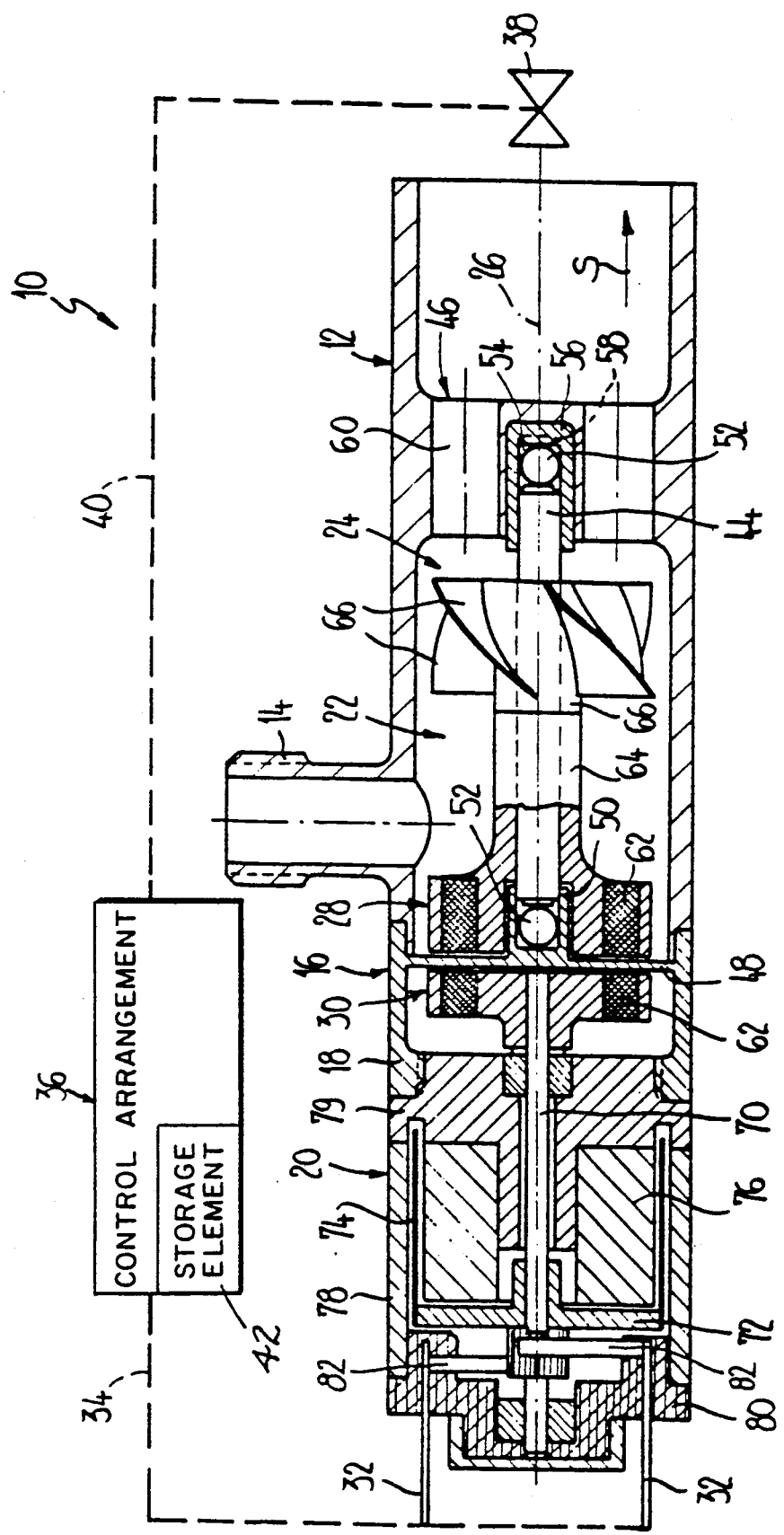

WATER FITTING FOR SANITARY INSTALLATIONS

BACKGROUND OF THE INVENTION

The present invention concerns a water fitting, particularly for domestic sanitary installations. The present invention particularly concerns such water fittings having a turbine wheel arranged in a flow duct and acted on by a flow of water to drive a sealed electrical generator.

Such a water fitting is, for example, known from the international Patent application published under the number WO 85/01337. This reveals a water dispenser whose water flow can be switched on and off by means of an electrically controlled valve. A turbine wheel acted on by the water is located in the flow duct of the water dispenser upstream relative to the valve and this turbine wheel drives a low power electrical generator. The generator is connected to a control arrangement controlling the valve, it being possible to charge the accumulator of this arrangement with the electricity supplied by the generator. The circular cross-section flow duct of the water dispenser has a 90 degree bend, the turbine wheel being upstream of this bend and the axis of rotation of the turbine wheel coinciding with the longitudinal axis of the tubular casing bounding the flow duct in this region. The generator is aligned with the turbine and is located outside the casing in the region of the 90 degrees bend, an opening being provided in the casing for the passage of the generator shaft coupled to the driven shaft of the turbine wheel.

A hat-shaped sealing element protruding through the opening in the casing into the flow duct is clamped between the generator and the casing of the water fitting. This sealing element has a hole extending in the axial direction for the driven shaft of the turbine wheel or the drive shaft of the generator. Between the inner surface of the sealing element and the generator shaft, there is an O-ring seal which, further in the axial direction, is in contact with the inner end surface of the sealing element and, opposite this, with a sealing disc provided on the generator shaft. This sealing arrangement leads to substantial losses relative to the low power of the turbine. In addition, it is subject to wear and aging which can lead to water penetrating into the inner part of the generator.

The object of the present invention is therefore to produce a water fitting having a turbine driven generator whose losses are extremely small and whose generator is reliably sealed against the flow duct independent of aging.

SUMMARY OF THE INVENTION

This object is achieved by having a wall of non-magnetizable material separate the flow duct from the generator. Magnetic coupling means is provided for coupling the turbine wheel in the flow duct to the generation situated outside the wall of non-magnetizable material.

The water fitting has no mechanical connection between the turbine wheel and the generator. On the contrary, two coupling parts are provided, these being separated from one another by the non-magnetizable partition and coupled to one another by means of a magnetic field penetrating the partition. There is, therefore, no further necessity for a dynamic seal which generates losses and is subject to aging.

Preferably, at least one of the coupling halves has a permanent magnet arrangement. On the other coupling part, an electro-magnetic arrangement or even quite simply a part in soft iron can be provided. This is then driven along by the magnetic field generated by the permanent magnet arrangement.

In a particularly preferred embodiment having good torque transmission properties in a small space and with simple construction, both coupling halves include one permanent magnet.

Another particularly simple embodiment of the water fitting uses large disk-shaped coupling halves for transmitting particularly large torques.

The design of the water fitting preferably involves few parts. One embodiment permits the water to flow in a straight line through the water fitting.

Using the present invention, an electrical water fitting can be constructed which is independent of extraneous electrical energy.

The invention is now described in more detail by means of an illustrative example shown in the accompanying single Figure.

BRIEF DESCRIPTION OF THE DRAWING

The Figure is a sectional view of a water fitting in accordance with the present invention.

DESCRIPTION OF THE PREFERRED EMBODIMENT

The water fitting 10 has an essentially hollow cylindrical casing part 12, for example brass, with an inlet connection 14 provided in one end region of the casing part 12 protruding towards the outside in the radial direction. The inlet connection end of the casing part 12 is closed by a thin-walled partition element 16 in a non-magnetizing material, for example brass or austentic stainless steel. At its end opposite to the casing part 12, the partition element 16 has a protruding hollow cylindrical tube part 18 which is aligned with the casing part 12 and into which is screwed a direct current generator 20.

A turbine wheel 24 whose rotational axis 26 coincides with the longitudinal axis of the substantially hollow-cylindrical casing part 12 is rotatably supported within the casing part 12, which bounds a flow duct 22 for the water supplied through the inlet connection 14. A first coupling part 28, which is provided in the region of the partition element 16, is rotationally solidly connected to the turbine wheel 24. A second coupling part 30, which is rotationally solidly connected to the generator 20, is provided on the opposite side of the partition element 16 from the first coupling part 28. The two coupling parts 28, 30 are magnetically coupled to one another, as is described in more detail below. The two connection terminals 32 of the generator 20 are connected to a control arrangement 36, as is indicated by the dotted line 34, and this control arrangement 36 is in turn electrically connected by means of the connection lead 40, also shown dotted, to a valve 38, symbolically represented and connected downstream of the casing part 12 when viewed in the flow direction S. The control arrangement 36 has a storage element (preferably an accumulator) shown diagrammatically and indicated by 42. This accumulator can be charged by the electricity supplied by the generator 20.

When the control arrangement 36 receives a signal, for example from a proximity sensor, the valve 38 is opened by means of the electricity stored in the storage element 42 so that the water commences to flow in the flow direction S. The turbine wheel 24, acted on by water flowing in the axial direction, begins to rotate, the rotation being transmitted through the partition element 16 to the generator 20 by means of the two coupling parts 28, 30. The storage element 42 is now charged by the electricity supplied by the generator 20. As soon as the control arrangement 36 receives a signal for the interruption of the water flow, again for example from the proximity sensor, the valve 38 is closed so that the turbine wheel 24, and hence also the generator 20, come to rest.

The turbine wheel 24 and the first coupling part 28 are seated rotationally solidly on a common shaft 44 which is rotatably supported at one end on the partition element 16 in the region of the first coupling part 28 and, at the other end, on a support partition 46 located within the casing part 12. For this purpose, the partition wall 48 of the partition element 16, which closes off the flow duct 22, has, in its central region, a bearing sleeve 50 protruding within the casing part 12, the longitudinal axis of this bearing sleeve coinciding with the axis of rotation 26 of the turbine wheel 24. A bearing ball 52 is provided in the bearing sleeve 50 and the end of the shaft 44 protruding into this bearing sleeve 50 supports itself on it in the axial direction. The support partition 46 has a blind hole 54 open towards the turbine wheel 24 and its axis coincides with the axis of rotation 26. A hat-shaped plastic bearing bush 56 is inserted into the blind hole 54 and in it, there is a further bearing ball 52 on which the other end of the shaft 32 supports itself axially. This end region of the shaft 44 is supported in the radial direction by the bearing sleeve 56. A carbide plate 58, shown dotted, can be provided on the inner end face of the bearing bush 56 so that axial forces can be accepted without difficulty. In order to avoid hindrance to the flow of water, a plurality of holes 60 extending in the axial direction is provided in the support partition 46. These holes are arranged in a circle around the axis of rotation 26.

In the region of the partition wall 48, the first coupling part 28 is designed to be disc-shaped and encloses, at a slight distance, the bearing sleeve 50. In this region, an annular permanent magnet 62, which is laterally magnetized on its end surface facing towards the partition wall 48, is inserted in the first coupling part 28. In the region of the inlet connection 14, the first coupling part 28 has a reduction in diameter which merges into a cylindrical part 64 which is followed by the turbine wheel 24. The reduction in diameter mentioned deflects the water supplied in the radial direction through the inlet connection 14 into the flow direction S which extends in the axial direction.

The turbine wheel 24 has a substantially cylindrical turbine body 66 which has the same diameter as the cylindrical part 64 of the first coupling part 28. Turbine blades 68, which are acted on by water flowing in the axial direction, protrude outwards from the turbine body 66 in the radial direction.

The second coupling part 30 seated on the rotor shaft 70 of the generator is also designed disc-shaped, an end surface facing towards the partition wall 48 extending parallel to it. The second coupling part also has a hollow cylindrical permanent magnet 62 which is also laterally magnetized on its end surface facing towards the partition wall 48. Such permanent magnets 62 are generally known and can be obtained, for example, from the Philips Company under the name "FERROXDURE".

The generator 20 is a direct current micromotor, Faulhaber system, operated as a generator. Such units are manufactured and sold, for example, by MINIMOTOR SA, Agno, Switzerland. A commutator plate 72, which carries a cylindrical, obliquely wound rotor coil 74, is seated on the rotor shaft 70. Within the rotor coil 74, there is a fixed location exciter magnet 76 which can be magnetized on its periphery, its magnetic field penetrating the rotor coil 74 and the magnetic circuit being completed by a hollow cylindrical soft iron sleeve 78. On its side facing towards the partition element 16, the soft iron sleeve 78 is connected to a retention flange 79 which is screwed into the tube part 18 and on which the rotor shaft 70 is supported. A plastic cover, on which the rotor shaft 70 is also rotatably supported and which holds the brushes 82, is inserted as a spigot into the other end of the soft iron sleeve 78. The brushes 82 are electrically connected to the connection terminals 32. Any suitable motor or generator can, of course, be used instead of the direct current micromotor shown and described here. Apart from very high efficiency, the generator 20 proposed exhibits an extremely low moment of inertia, which leads to particularly good starting properties and hence to the generation of electricity even in the case of small water flow velocities.

In order to avoid having to deflect the water, it is also conceivable that the first coupling part should be formed on the turbine wheel itself. It would then be possible to have an annular permanent magnet surrounding the turbine blades in the peripheral direction. The second coupling part could, in this case, be located coaxially around the casing and, for example, supported ratably on it, the casing then consisting of a non-magnetizing material at least in the region of the two coupling parts. The rotational motion of the turbine wheel would then be transmitted to the second coupling part through the casing wall, this rotational motion being then transmitted, for example, by means of a gear from the second coupling part to a generator.

The water fitting, which is independent of an extraneous electrical energy source, can have a plurality of valves controlled by the control arrangement. Temperature measurement probes or displays, for temperature for example, can also be provided, however, and these are all supplied from the storage element charged by the generator. It is, in particular, also conceivable that the water fitting should therefore be designed as a mixing fitting and have an adjustable valve for the hot water and an adjustable valve for the cold water. The flow quantity of the water concerned would be controlled as a function of the mixed water temperature measured by means of a temperature sensor. The turbine wheel is then driven either by mixed water, cold water or hot water.

Other permanent magnets, for example rod-shaped, can of course be provided instead of the annular permanent magnets 62 on the coupling parts 28, and 30. Additional variations and modifications exist which are within the scope and spirit of the invention as described and as defined in the following claims.

What is claimed is:

1. Water fitting, particularly for domestic sanitary installations, having a flow duct, having a turbine wheel arranged in this flow duct and acted on by flowing water and having an electrical generator driven by the turbine wheel and sealed against the flow duct, wherein a wall part (58) in a non-magnetizable material and separating the flow duct (22) from the generator (20) is provided, wherein a first coupling part (28) connected to the turbine wheel (240 is arranged on one side of the wall part (48) and a second coupling part (30) connected to the generator is arranged on the other side, the coupling parts (28, 30) being magnetically coupled with one another, wherein the turbine wheel is supported on a shaft, one end of which is rotatably supported on the partition element, which is fixed to the cylindrical casing part after the introduction of the first coupling part, turbine wheel and shaft into the casing part.

2. Water fitting as claimed in claim 14, wherein at least one of the coupling parts (28, 30) has a permanent magnet arrangement (62) for generating a magnetic field penetrating the wall part (48) and wherein the other coupling part (30, 28) is coupled with the first coupling part by means of the magnetic field.

3. Water fitting as claimed in claim 2, wherein both coupling parts (28, 30) each have one permanent magnet arrangement (62).

4. Water fitting as claimed in claim 1, having an essentially hollow cylindrical casing part, with an inlet connection provided in a first end region of the casing part protruding towards the outside in a radial direction, the inlet connection end of the casing part being closed by a thin-walled partition element formed from a non-magnetizing material, the partition element including a protruding hollow cylindrical tube part at its end opposite to the casing part, the protruding hollow cylindrical part being generally aligned with the casing part and receiving a direct current generator therein.

5. Water fitting according to claim 1, wherein the turbine wheel and the first coupling part are provided on a common shaft rotatably supported at one end of the partition element in the region of the first coupling part and, at the other end, on a support partition provided within the casing part.

6. A water fitting for use in domestic sanitary installations comprising: a flow duct defined at least in part by a wall of a non-magnetizable material, a turbine wheel arranged in the flow duct so as to be acted on by water flowing through the duct, an electrical generator situated outside the flow duct and separated from the turbine wheel by the wall of a non-magnetizable material, and magnetic coupling means for magnetically coupling the turbine wheel and the electrical generator to permit the electrical generator to be driven by the turbine wheel when acted on by water flowing through the duct, the magnetic coupling means comprising a first coupling part fixed to the electrical generator, wherein at least one of the coupling parts includes a permanent magnet having field penetrating the wall of non-magnetizable material, control means including electrical storage means connected to the electrical generator and valve means for controlling the flow of water through the flow duct, the turbine wheel supported on a shaft, one end of which is rotatably supported on the partition element, which is fixed to the cylindrical casing part after the introduction of the first coupling part, turbine wheel and shaft into the casing part.

7. A water fitting as claimed in claim 6 wherein the magnetic coupling means comprises a first coupling part fixed to the turbine wheel, a second coupling part fixed to the electrical generator, and wherein at least one of the coupling parts includes a permanent magnet having a field penetrating the wall of non-magnetizable material.

8. A water fitting as claimed in claim 6 wherein the turbine wheel and electrical generator are aligned along a common axis of rotation, and wherein the wall of non-magnetizable material is situated perpendicularly to the axis of rotation.

9. A water fitting as claimed in claim 6 further comprising control means including electrical storage means connected to the electrical generator and valve means for controlling the flow of water through the flow duct.

10. Water fitting, particularly for domestic sanitary installations, having a flow duct, having a turbine wheel arranged in this flow duct and acted on by flowing water and having an electrical generator driven by the turbine wheel and sealed against the flow duct, wherein a wall part (48) in a non-magnetizable material and separating the flow duct (22) from the generator (20) is provided, wherein a first coupling part (28) connected to the turbine wheel (24) is arranged on one side of the wall part (48) and a second coupling part (30) connected to the generator is arranged on the other side, the coupling parts (28, 30) being magnetically coupled with one another, wherein the first coupling part is disposed near the inlet and has a reduced diameter region to deflect the water flowing into the inlet axially toward the turbine wheel.

11. Water fitting according to claim 10 wherein the first coupling part comprises a cylindrical part downstream of the deflection region, the turbine wheel having a substantially cylindrical turbine body which has the same diameter as the cylindrical part of the first coupling part, the turbine body and the cylindrical part being arranged in end-to-end relation.

12. Water fitting as claimed in claim 10, wherein the axes of rotation (26) of the turbine wheel (24) and of the generator (20) are mutually aligned and the wall part (48) extends substantially at right angles to these axes of rotation (26).

13. Water fitting as claimed in claim 12, wherein the coupling parts (28, 30) provided on each side of the wall part (38) are designed disc-shaped and are arranged essentially parallel to the wall part (48).

14. Water fitting as claimed in claim 13, wherein both coupling parts (28, 30) have a cylindrical or hollow cylindrical permanent magnet (62) laterally magnetized on the end surface facing towards the wall element (48).

15. Water fitting as claimed in claim 10, wherein the generator (20) is connected to an electrical control arrangement (36) which has a storage element (42), preferably an accumulator, which can be charged with the electricity generated by the generator (20) and wherein a valve arrangement (38) electrically controllable by means of the control arrangement (36) is provided for the regulation of the water flow.

* * * * *